June 2, 1970  C. C. TYER, JR  3,515,019
MACHINE FOR CUTTING FIBER GLASS BOARDS TO FORM DUCTS
Filed April 10, 1968  5 Sheets-Sheet 1
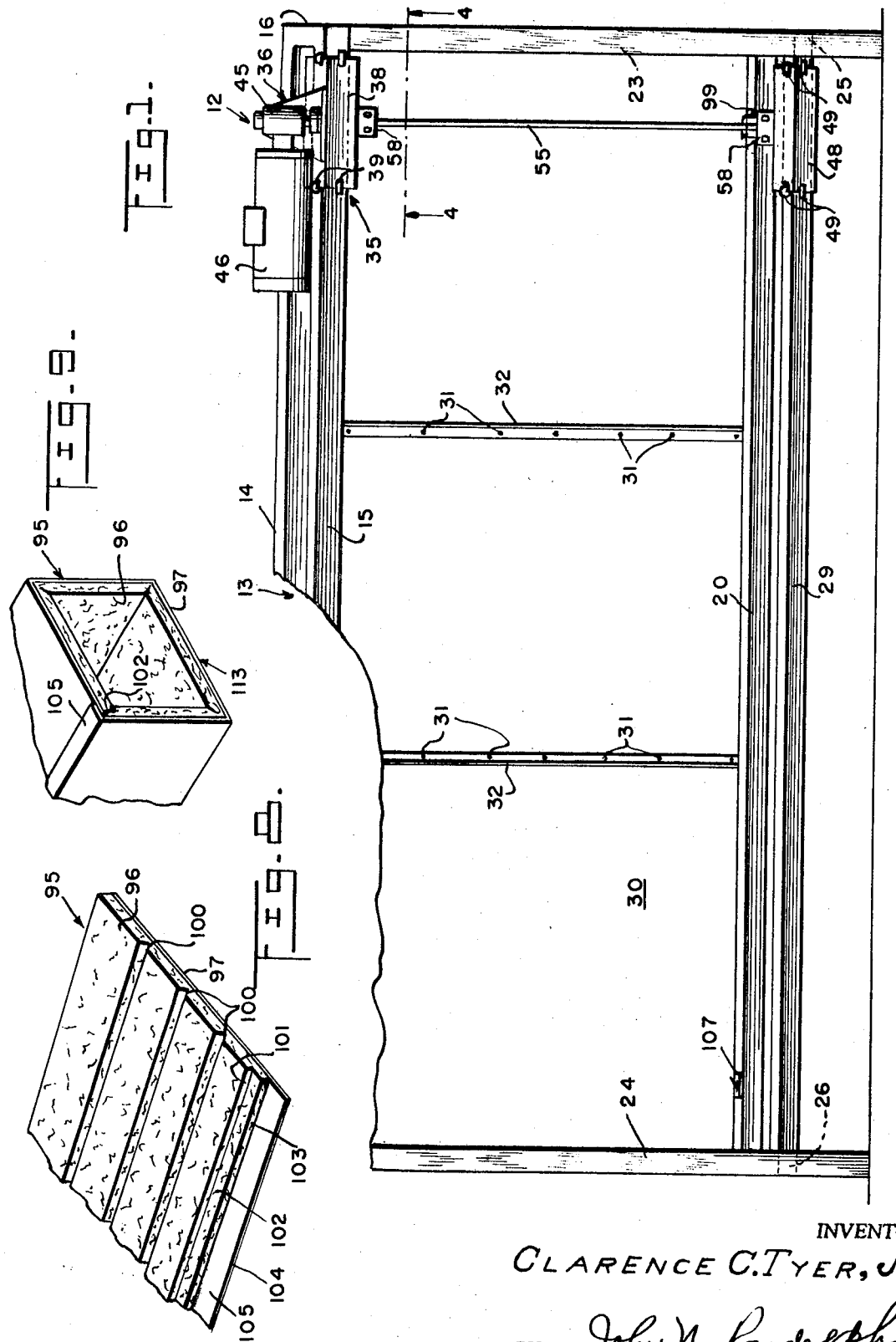
INVENTOR
CLARENCE C. TYER, JR.
BY John N. Randolph
ATTORNEY

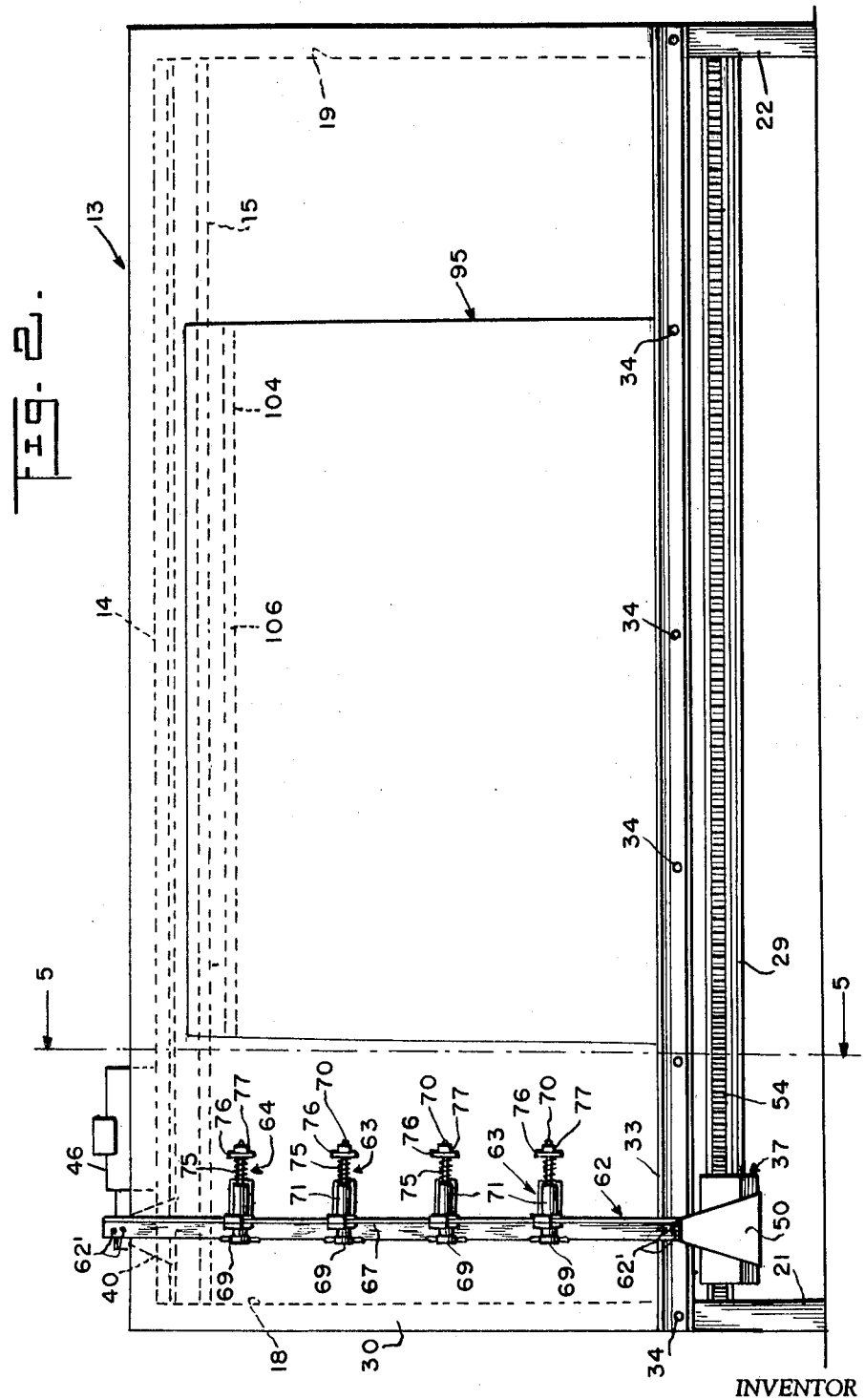

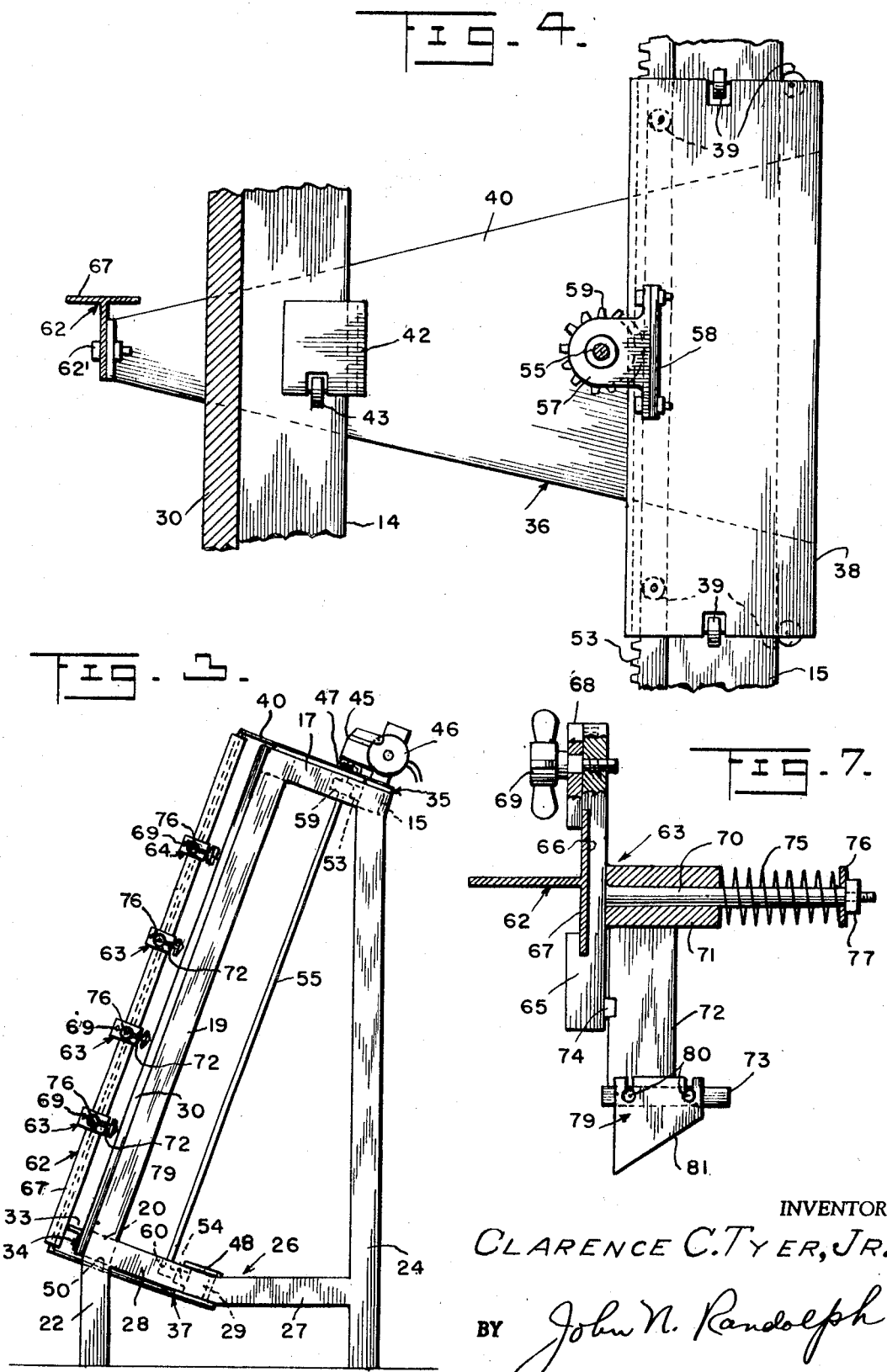

June 2, 1970  C. C. TYER, JR  3,515,019
MACHINE FOR CUTTING FIBER GLASS BOARDS TO FORM DUCTS
Filed April 10, 1968  5 Sheets-Sheet 4
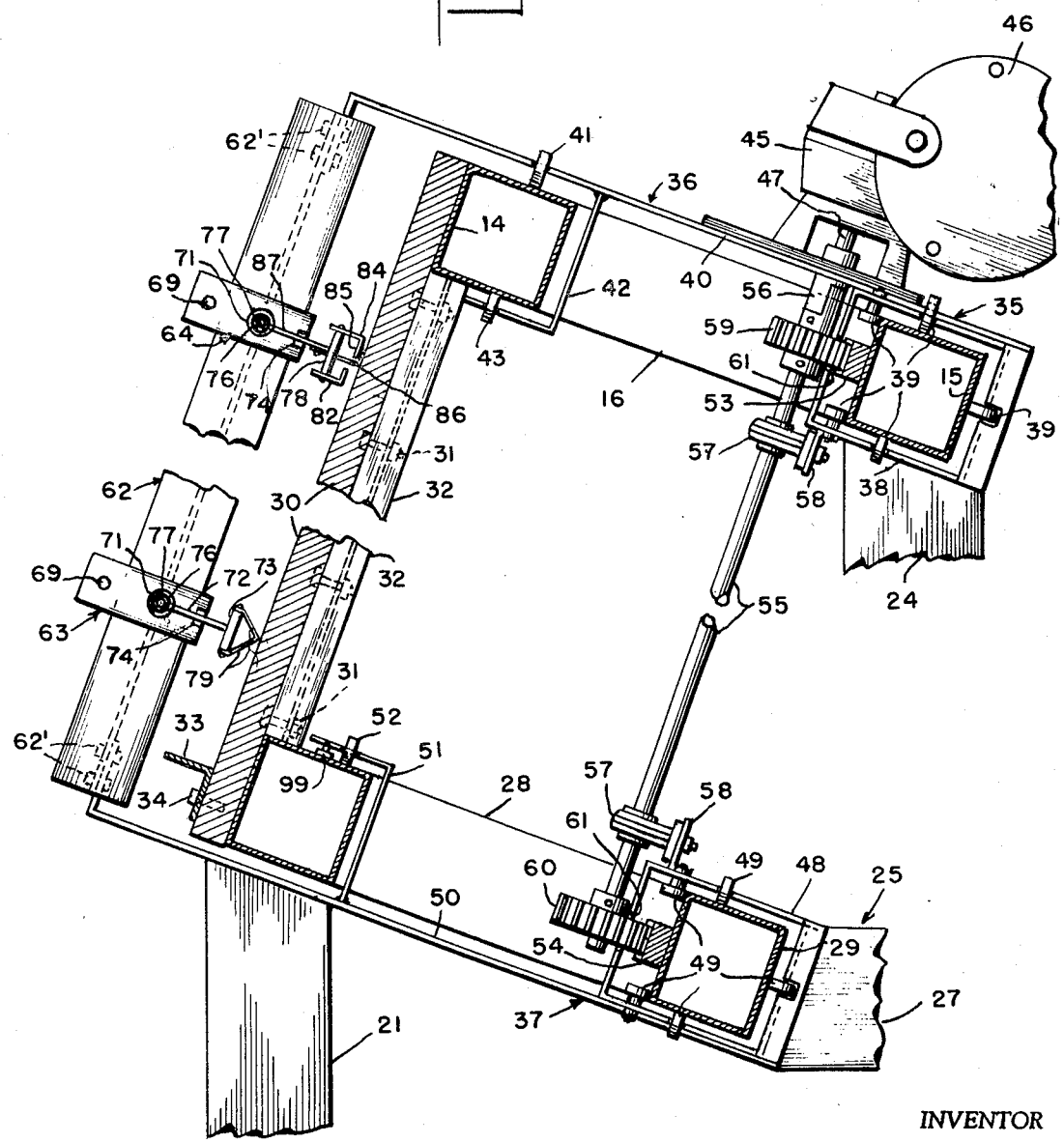
INVENTOR
CLARENCE C. TYER, JR.
BY John N. Randolph
ATTORNEY June 2, 1970     C. C. TYER, JR     3,515,019
MACHINE FOR CUTTING FIBER GLASS BOARDS TO FORM DUCTS
Filed April 10, 1968     5 Sheets-Sheet 5
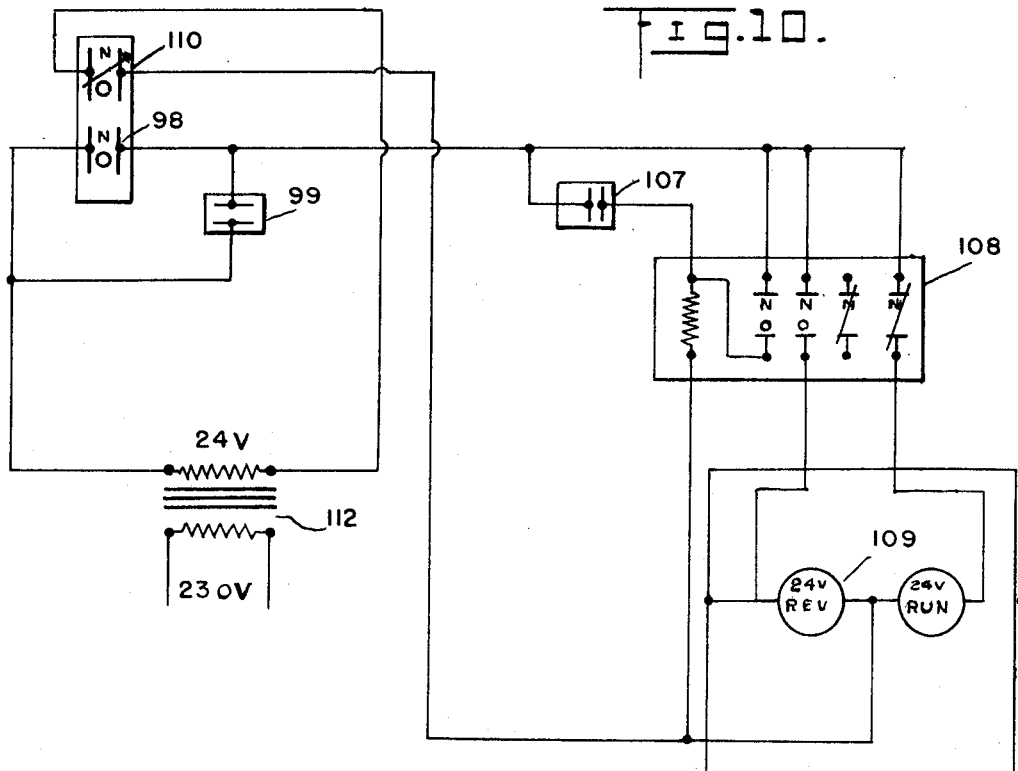
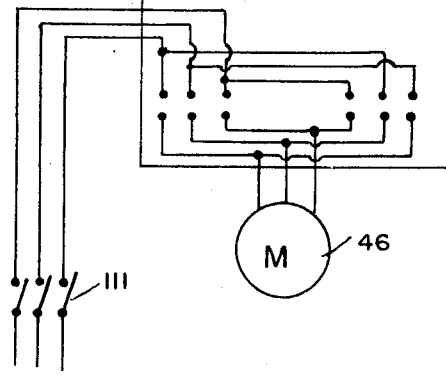
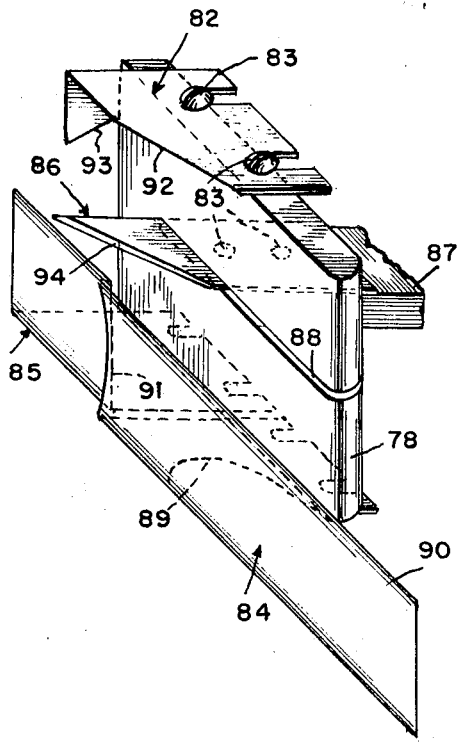
INVENTOR
CLARECE C. TYER, JR.
BY John N. Randolph
ATTORNEY United States Patent Office 3,515,019
Patented June 2, 1970

3,515,019
MACHINE FOR CUTTING FIBER GLASS
BOARDS TO FORM DUCTS
Clarence C. Tyer, Jr., 4233 Prospect Drive,
Carmichael, Calif. 95608
Filed Apr. 10, 1968, Ser. No. 720,077
Int. Cl. B26d 3/06
U.S. Cl. 83—5                                    3 Claims

ABSTRACT OF THE DISCLOSURE

A power operated machine having a plurality of cutters carried by a traveling unit of the machine for simultaneously producing all or any of the cuts required in a fiber glass board to enable the board to be converted into an air dust or a portion of an air duct of rectangular cross section. The blade holders supporting the cutting blades are adjustably supported on a tool bar, forming a part of the traveling unit of the machine, for cutting the fiber glass boards for producing ducts of different sizes and rectangular shapes.

BACKGROUND OF THE INVENTION

The present invention relates to the art of cutting fiber glass boards having a thin metallic ply on one side thereof for converting the board into an air duct with the metallic ply forming a jacket around the fiber glass insulation.

The prior art provides a number of hand tools by which the various required cuts are manually produced individually and successively.

SUMMARY

It is a primary object of the present invention to provide a power driven machine capable of being operated for simultaneously accomplishing all of the cuts required in a fiber glass board to enable the board to be converted into an air duct or a portion of an air duct of rectangular cross section.

Another object of the invention is to provide a machine including a plurality of blade holders each capable of supporting one or more blades for accomplishing the various cuts required in the fiber glass board.

A further object of the invention is to provide a machine wherein the blade holders are adjustably supported on a part of the traveling carriage for varying the location of the cuts produced by the blades as said carriage part travels across the board for preparing the board to form an air duct or portions of an air duct of a desired rectangular size and shape.

Various other objects and advantages of the invention will hereinafter become more fully paparent from the following description of the drawings, illustrating a presently preferred embodiment thereof, and wherein:

BRIEF DESCRIPTION OF THE DRAWINGS

FIG. 1 is a rear elevation view of the machine;

FIG. 2 is a front elevation view thereof;

FIG. 3 is an end elevational view looking from right to left of FIG. 2;

FIG. 4 is an enlarged fragmentary sectional view taken substantially along the line 4—4 of FIG. 1;

FIG. 5 is an enlarged fragmentary cross sectional view, taken substantially along a plane as indicated by the line 5—5 of FIG. 2;

FIG. 6 is an enlarged fragmentary perspective view of a part of one of the blade holders and showing the blades supported thereby;

FIG. 7 is an enlarged sectional view, partly in side elevation, of one of the blade holders;

FIG. 8 is a fragmentary perspective view on a reduced scale showing a portion of the fiber glass board after being cut by the blades of the machine and ready to be formed into an air duct;

FIG. 9 is an end view in perspective of the air duct formed from the fiber glass board of FIG. 8, and FIG. 10 is a diagrammatic view illustrating the electrical system of the machine.

DESCRIPTION OF THE PREFERRED EMBODIMENT

Referring more specifically to the drawings, the machine for cutting fiber glass boards to form air ducts or portions of air ducts is designated generally 12 and includes an elongated stand, designated generally 13. The stand 13 includes a front top member 14 and a rear top member 15 each of which extends from end-to-end thereof. The members 14 and 15 are connected to one another at their ends by top cross members 16 and 17, as seen in FIGS. 1 and 3. Front end members 18 and 19 extend downwardly from the ends of the top front member 14 and are inclined downwardly and outwardly of the stand 13, as seen in FIGS. 3 and 5. A bottom front member 20 extends between and is secured to the lower ends of the end members 18 and 19, and upright front legs 21 and 22 extend downwardly from the end members 18 and 19, respectively. Upright rear legs 23 and 24 are fixed to and extend downwardly from the ends of the upper rear member 15. A bottom cross brace 25 extends between a lower portion of the leg 23 and the lower end of the end member 18. A similar brace 26 extends between a lower portion of the rear leg 24 and the lower end of the end member 19. Each bottom cross brace 25 and 26 includes a substantially horizontal rear portion 27 and an upwardly inclined forward portion 28. A bottom member 29 extends between and is secured to the bottom cross braces 25 and 26 at the rear ends of the portions 28 of said bottom braces, so as to be disposed the same distance from the bottom member 20 as the rear top member 15 is spaced from the top front member 14.

The stand includes a front wall member 30 which is disposed aginst front faces of the stand parts 14, 18, 19 and 20 and which is positioned at an incline downwardly and outwardly or forwardly. The wall member 30 may be secured by fastenings 31 which are anchored to brace members 32 which extend between and are secured to the members 14 and 20. All the parts 14 to 29 of the stand 13 are preferably formed of rigid tubular material of square or rectangular cross section, as best seen in FIG. 5, and the longitudinal members 14, 15, 20 and 29 are canted so that fornt and rear walls thereof are disposed parallel to the plane of the wall member 30. An angle member 33 extends lengthwise of the front side of the wall member 30, near its bottom edge, and is secured thereto by fastenings 34 to form a ledge or shelf for a purpose which will hereinafter be described.

A carriage, designated generally 35, is mounted for movement longitudinally of the stand 13 and includes an upper trolley 36 and a lower trolley 37. The upper trolley 36 includes a rectangular member 38 which is disposed around the stand member 15 and which is provided with rollers 39 which engage the four sides of the member 15 and facilitate the travel of the member 38 longitudinally thereof. A bar 40 extends forwardly from the top portion of the member 38 over the front member 14 and carries a roller 41 which rides on the top surface of the member 14. An angular member 42 depends from the bar 40 and carries a roller 43 in the bottom portion thereof which rides on the bottom surface of the member 14. A plate 44, which is supported by the bar 40, has a reduction gear unit 45 mounted thereon and secured thereto and which supports an electric motor 46 for driving an output shaft 47 which extends downwardly from the unit 45.

The bottom trolley 37 also includes a member 48 of rectangular cross section which is supported around the stand member 29 by rollers 49 which are carried by the member 48 and which engage the four sides of the stand member 29. A bar 50 extends forwardly from the member 48, under the bottom front stand member 20 and has an upstanding angular extension 51 the top portion of which carries a roller 52 which rides on the upper surface of the member 20.

A rack 53 is fixed to and extends the length of the forward side of the member 15, and a rack 54 is similarly supported by the member 29. The racks 53 and 54 are disposed within the trolley members 38 and 48, respectively, and between rollers 39 and 49 which engage the front sides of the members 15 and 29. The upper end of a shaft 55 is secured by a coupling 56 to the shaft 47 for rotation therewith. The shaft 55 is journaled in bearings 57 which are supported by brackets 58 which are fixed to and extend from the trolley parts 38 and 48.

Pinions 59 and 60 are fixed to the shaft 55 and mesh with the racks 53 and 54, respectively, and extend through openings 61 in the front walls of the members 38 and 48. A tool bar 62, forming a part of the carriage 35, is secured by fastenings 62' to forward ends of the bars 40 and 50 and is supported thereby spaced outwardly from and parallel to the wall 30. The tool bar 62 is of T-shaped cross section, as seen in FIG. 7, to support a plurality of blade holders 63 and 64. Each blade holder 63 includes a bar 65 having a recess 66 to receive the flange or head 67 of the tool bar 62 which is detachably clamped therein by a clamping plate 68 and screw fastening 69 for securing the blade holder 63 at any point along the tool bar 62. A stem 70 extends forwardly from the bar 65 to receive a sleeve 71 which fits turnably and slidably thereon. A shank 72 extends outwardly from a part of the sleeve 71 and supports a blade mounting head 73, spaced from and substantially parallel to the stem 70. A pair of transversely spaced lugs 74 extend from an end portion of the bar 65 and normally straddle a part of the shank 72 to retain the sleeve 71 non-rotatably on the stem 70. A compression spring 75 is disposed on the stem 70 between the outer end of the sleeve 71 and a washer 76 and nut 77 which are mounted on the threaded outer end of the stem 70. The spring 75 yieldably retains the sleeve 71 against the bar 65 and the shank 72 in engagement between the lugs 74. The blade holder 64 differs from the blade holder 63 only in the head 78 thereof, as seen in FIG. 6, is of a different construction than the head 73, as will hereinafter be described.

The tool bar 62 is shown provided with three blade holders 63 and a single upper blade holder 64. The head 73 of each blade holder 63 supports a pair of corresponding cutting blades 79 which are attached by screw fastenings 80 to the side edges of the head 73 and which blades converge toward one another from the head, as seen in FIG. 5, and have inclined forwardly facing cutting edges 81, as seen in FIG. 7. Referring to FIG. 5, a blade 82 is secured by fastenings 83 to the bottom edge of the head 78 of the upper blade holder 64. Two blades 84 and 85 are secured by additional fastenings 83 to the upper edge of the head 78 and a blade 86 is secured by other fastenings 83 against one side of the shank 87 and extends through a slot 88 of the head 78.

For the sake of clarity, the shank 87 and the head 78 with the blades carried thereby are shown in FIG. 6 as the parts would appear if rotated approximately 180° from their operative positions of FIG. 5. The blade 84 is disposed forwardly of the blade 85 and has a forwardly facing cutting edge 89 which is disposed parallel to the shank 87, and a flat shoe 90, which is disposed perpendicular to the shank 87. The rear blade 85 has a cutting edge 91 which is disposed in a plane parallel to the plane of the shoe 90 and slightly nearer the head 78 than the shoe 90. The blade 82 has an inclined forwardly facing cutting edge 92 which is disposed in a plane parallel to the cutting edge 89 and a cutting edge 93 which forms an extension of the outer end of the cutting edge 92 and which is disposed perpendicular thereto and parallel to the cutting edge 91 but nearer the head 78 than said cutting edge 91. The blade 86 has an inclined cutting edge 94 which is disposed parallel to the cutting edge 92 and the outer end of which terminates at the plane of the cutting edge 91.

FIG. 8 illustrates a portion of a piece of conventional duct board 95 composed of a thick ply 96 of fiber glass insulation and a thin ply 97 of a metallic material and which is secured to one side of the insulation 96. The board 95 is positioned against the wall 30 with the backing ply 97 engaging said wall and one longitudinal edge of the board resting on the ledge 33. With the carriage 35, disposed as seen in FIG. 2 at the left hand end of the stand 13 and to the left of the board 95, a normally open push button switch 98 (FIG. 10) is closed to energize the motor 46 to cause the shaft 55 and pinions 59 and 60 to be driven for propelling the carriage 35 from left to right of FIG. 2. Initial travel of the carriage 35 closes a limit switch 99, mounted on the stand member 20, for maintaining the electric circuit closed when the switch 98 is released.

As the carriage 35, including the tool bar 62, travels from left to right of FIG. 2, the pairs of blades 79 of the three blade holders 63 will cut three parallel V-shaped grooves 100 in the insulation 96 and from end-to-end of the board 95. The edge 92 of the blade 82 will make the cut 101 and the edge 93 will make the cut 102. The edge 94 of the blade 86 will cut through the insulation 96 as seen at 103 but without cutting the backing ply 97. The shoe 90 will travel under the backing ply 97 and the edge 89 of the blade 84 will cut off the excess upper edge portion of the board 95 along the edge 104. The edge 91 of the blade 85 will scrape the strip 106 of insulation from the exposed flap 105, as indicated in dotted lines in FIG. 2.

The blade 84 may be used alone for cutting flat material to size. The sleeves 71 of blade holders 63 can be pulled outwardly against the springs 75 to disengage the shanks 72 from the lugs 74 so that the parts 71, 72 and 73 can be turned 180° from their position of FIG. 5 to an inoperative position.

As the carriage 35 competes its travel from left to right of FIG. 2, and from right to left of FIG. 1, the part 51 thereof will engage and close the limit switch 107 to activate the control relay 108. This will effect reversing of the motor 46 by the magnetic starter 109, so that the shaft 55 will be driven in the opposite direction for propelling the carriage 35 back to its position of FIGS. 1 and 2, and during which travel the board 95 is propelled from right to left of FIG. 2 and off of the stand 13 by engagement of the blades with the right hand end of said board. As the carriage 35 reaches its position of FIGS. 1 and 2, the part 51 thereof will engage and actuate the limit switch 99 to open said switch and stop the carriage in its position of FIGS. 1 and 2, ready for its next cycle of operation after another board 95 has been applied to the wall 30. The push button 110 can be depressed to stop movement of the carriage 35 in any position of its travel. This travel will be interrupted only so long as the switch 110 is held closed or the switch 111 of the main power supply line is opened. The circuit also includes a step down transformer 112 for the circuits of the switches.

The board 95 after having been cut, and, as shown in FIG. 9, is folded into rectangular form with the flap or extension 105 secured in overlapping relation to form an air duct or a portion of an air duct 113 of rectangular cross section.

Various modifications and changes are contemplated and may be resorted to, without departing from the function or scope of the invention, as will hereinafter be defined by the appended claims.

I claim as my invention:

1. A machine for cutting fiber glass board to form an air duct or a portion of an air duct, comprising a stand including front and rear top and bottom rail members, a carriage mounted for reciprocating travel on said stand and including an upper trolley mounted on the top rail members and a lower trolley mounted on said bottom rail members, said trolleys having wheels riding on said rail members, a power unit supported by the carriage and movable therewith for driving the carriage in opposite directions relative to the stand, a plurality of blade holders, at least one blade supported by each blade holder, means forming a part of said carriage on which the blade holders are mounted for travel with the carriage, and means forming a part of said stand and adapted to support a fiber glass board in a position to be cut by the blades during travel of the carriage for simultaneously producing all of the cuts in the board necessary for converting the board into an air duct or a portion of an air duct of rectangular cross section.

2. A machine as in claim 1, and each blade holder including an adjustably mounted blade supporting part movable to an inoperative position for supporting the blade carried thereby in a position out of engagement with the board during the cutting operation of the machine.

3. A machine as in claim 1, at least certain of said rail members being of multi-sided cross section, and said wheels engaging a plurality of the sides of last mentioned rail members.

References Cited

UNITED STATES PATENTS

| | | | |
|---|---|---|---|
| 2,436,111 | 2/1948 | Lowe | 83—5 X |
| 3,151,794 | 10/1964 | Brand | 83—11 X |
| 3,242,780 | 3/1966 | Ried et al. | 83—5 |
| 3,274,868 | 9/1966 | Williams | 83—5 |
| 3,424,357 | 1/1969 | Curtze et al. | 83—11 X |

FRANK T. YOST, Primary Examiner

U.S. Cl. X.R.

83—562, 926